(12) United States Patent
Fisher et al.

(10) Patent No.: US 10,155,588 B2
(45) Date of Patent: Dec. 18, 2018

(54) RECONFIGURABLE BATTERY-OPERATED VEHICLE SYSTEM

(71) Applicant: AeroVironment, Inc., Simi Valley, CA (US)

(72) Inventors: Christopher E. Fisher, Simi Valley, CA (US); Phillip T. Tokumaru, Thousand Oaks, CA (US); Marc L. Schmalzel, Simi Valley, CA (US); John Peter Zwaan, Simi Valley, CA (US); Jeremy D. Tyler, Thousand Oaks, CA (US); Justin B. McAllister, Seattle, WA (US); Gabriel E. Torres, Seattle, WA (US); Pavel Belik, Simi Valley, CA (US)

(73) Assignee: AeroVironment Inc., Simi Valley, CA (US)

( * ) Notice: Subject to any disclaimer, the term of this patent is extended or adjusted under 35 U.S.C. 154(b) by 0 days.

(21) Appl. No.: 15/911,146

(22) Filed: Mar. 4, 2018

(65) Prior Publication Data
US 2018/0305013 A1    Oct. 25, 2018

Related U.S. Application Data

(63) Continuation of application No. 14/949,805, filed on Nov. 23, 2015, which is a continuation of application
(Continued)

(51) Int. Cl.
*B64C 39/02*    (2006.01)
*B60K 1/00*    (2006.01)
(Continued)

(52) U.S. Cl.
CPC .......... *B64C 39/024* (2013.01); *A63H 27/12* (2013.01); *B60K 1/00* (2013.01); *B60K 1/04* (2013.01);
(Continued)

(58) Field of Classification Search
CPC ........ A63H 27/12; B64C 39/024; B64C 27/00
See application file for complete search history.

(56) References Cited

U.S. PATENT DOCUMENTS

| | | | | |
|---|---|---|---|---|
| 4,183,173 A | * | 1/1980 | Ogawa | A63H 33/003 446/279 |
| 4,636,178 A | * | 1/1987 | Oda | A63H 33/003 446/462 |

(Continued)

*Primary Examiner* — Justin M Benedik
(74) *Attorney, Agent, or Firm* — Eric J. Aagaard, Esq.; The Law Office of John A. Griecci

(57) ABSTRACT

A quadrotor UAV including ruggedized, integral-battery, load-bearing body, two arms on the load-bearing body, each arm having two rotors, a control module mounted on the load-bearing body, a payload module mounted on the control module, and skids configured as landing gear. The two arms are replaceable with arms having wheels for ground vehicle use, with arms having floats and props for water-surface use, and with arms having pitch-controlled props for underwater use. The control module is configured to operate as an unmanned aerial vehicle, an unmanned ground vehicle, an unmanned (water) surface vehicle, and an unmanned underwater vehicle, depending on the type of arms that are attached.

10 Claims, 17 Drawing Sheets

Related U.S. Application Data

No. 13/694,388, filed on Nov. 26, 2012, which is a continuation of application No. PCT/US2011/000953, filed on May 26, 2011.

(60) Provisional application No. 61/399,168, filed on Jul. 7, 2010, provisional application No. 61/396,459, filed on May 26, 2010.

(51) Int. Cl.

| | |
|---|---|
| *B63G 8/08* | (2006.01) |
| *B63H 21/17* | (2006.01) |
| *B64D 27/00* | (2006.01) |
| *B64D 27/24* | (2006.01) |
| *B64C 27/00* | (2006.01) |
| *A63H 27/00* | (2006.01) |
| *B60K 17/356* | (2006.01) |
| *B60K 7/00* | (2006.01) |
| *B60K 1/04* | (2006.01) |
| *B63G 8/00* | (2006.01) |
| *B63B 35/00* | (2006.01) |

(52) U.S. Cl.
CPC .......... *B60K 7/0007* (2013.01); *B60K 17/356* (2013.01); *B63G 8/08* (2013.01); *B63H 21/17* (2013.01); *B64C 27/00* (2013.01); *B64D 27/00* (2013.01); *B64D 27/24* (2013.01); *B60K 2007/0092* (2013.01); *B60Y 2200/52* (2013.01); *B63B 2035/008* (2013.01); *B63G 2008/005* (2013.01); *B64C 2201/027* (2013.01); *B64C 2201/042* (2013.01); *B64C 2201/108* (2013.01)

(56) References Cited

U.S. PATENT DOCUMENTS

| | | | | |
|---|---|---|---|---|
| 4,892,503 | A * | 1/1990 | Kumazawa | A63H 17/004 446/437 |
| 6,589,098 | B2 * | 7/2003 | Lee | A63H 17/004 446/431 |
| 6,773,321 | B1 * | 8/2004 | Urquiaga | A63H 17/28 446/454 |
| 6,824,095 | B2 * | 11/2004 | Mao | B64C 37/00 244/12.5 |
| 7,090,164 | B2 * | 8/2006 | Akaro | B64C 27/08 244/17.23 |
| 7,306,186 | B2 * | 12/2007 | Kusic | B64C 27/08 244/17.23 |
| 2009/0283629 | A1 * | 11/2009 | Kroetsch | A63H 27/12 244/17.23 |
| 2010/0243794 | A1 * | 9/2010 | Jermyn | A63H 27/12 244/17.23 |

* cited by examiner

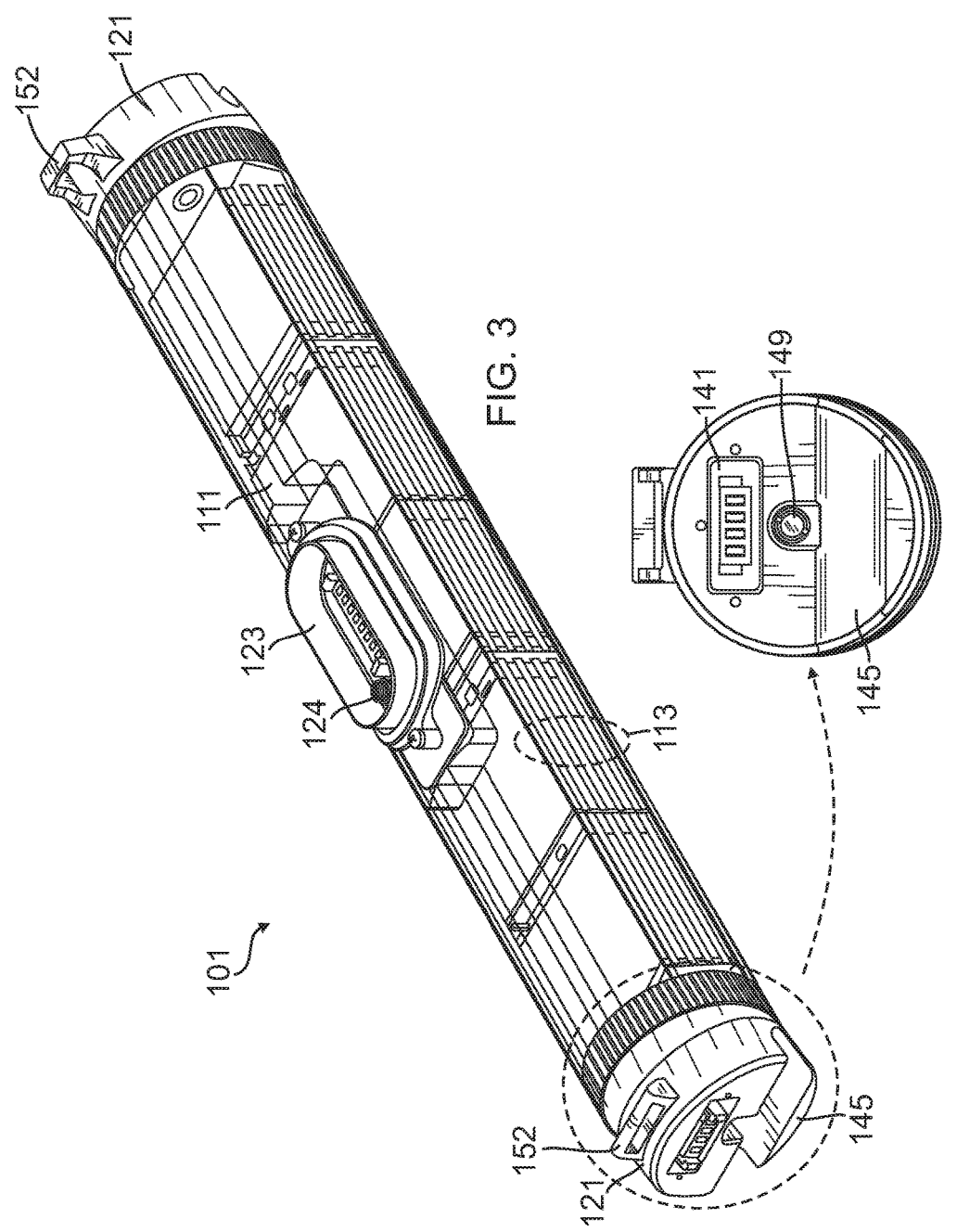

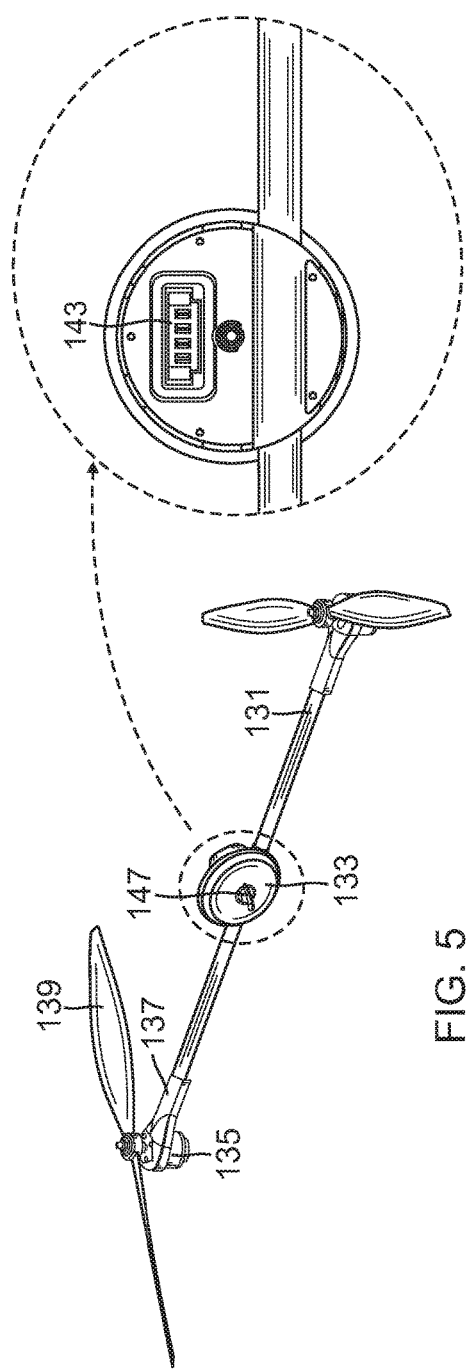
FIG. 5
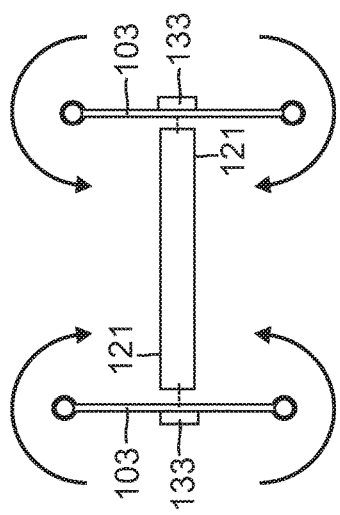
FIG. 6
FIG. 7

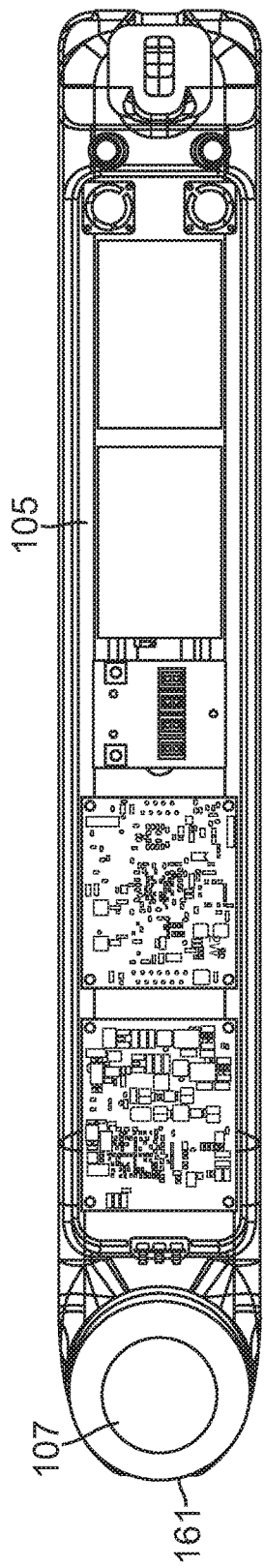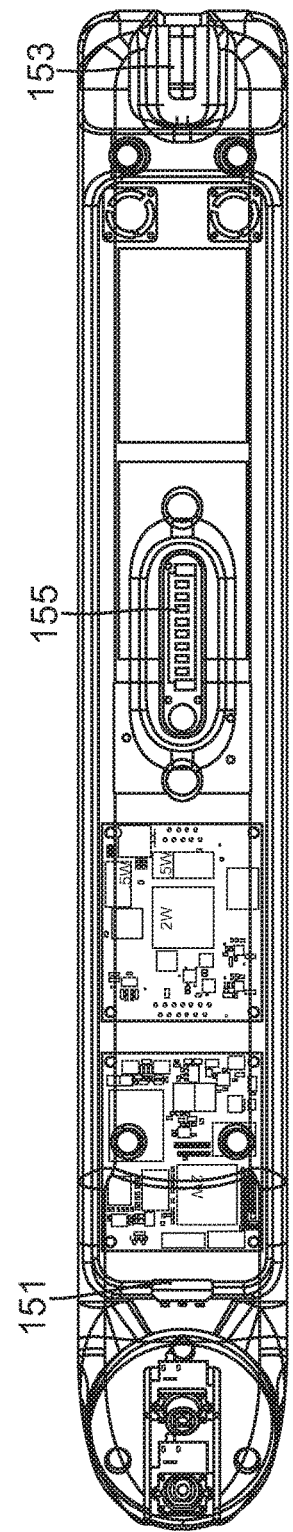
FIG. 8
FIG. 9

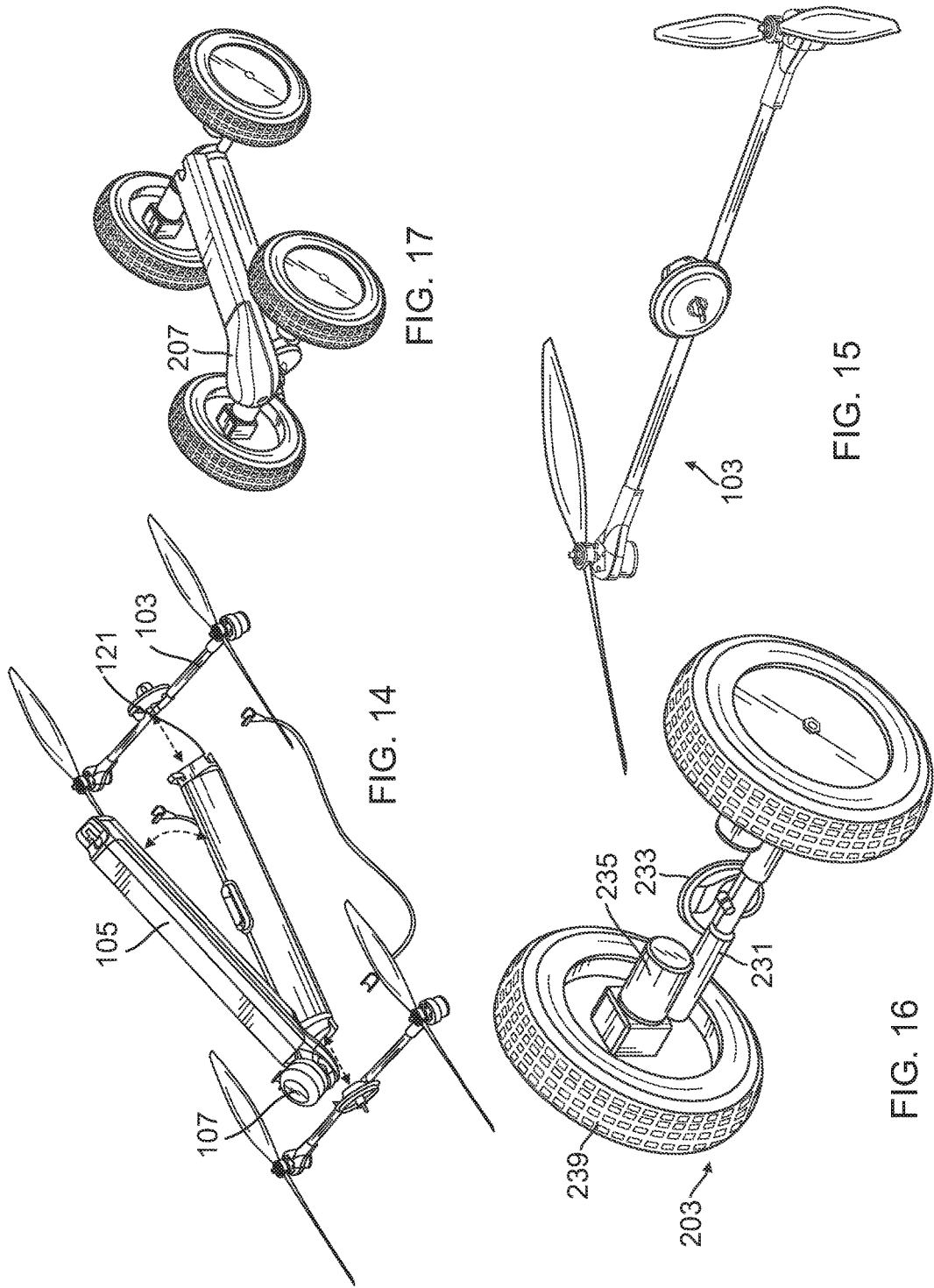

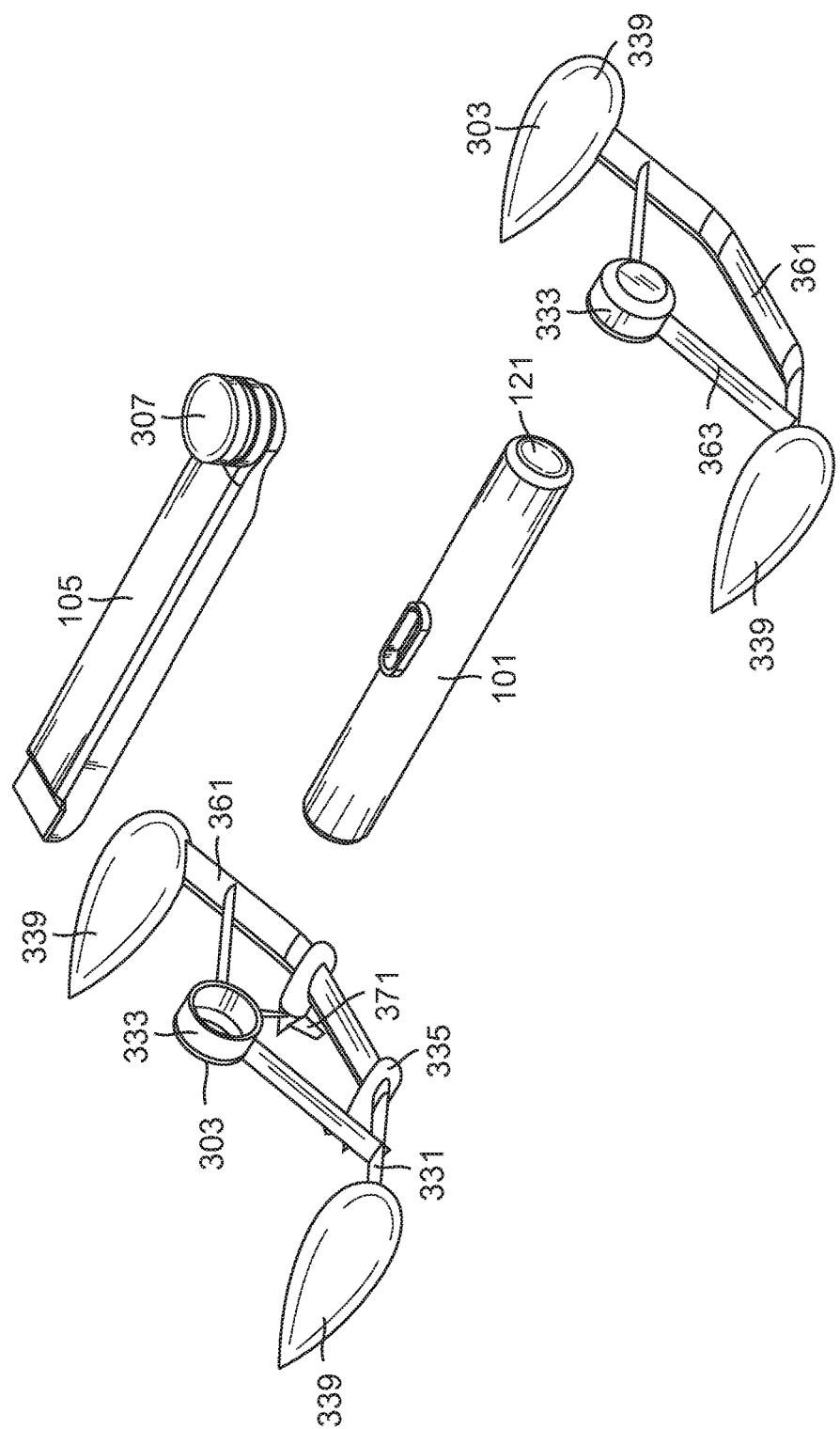

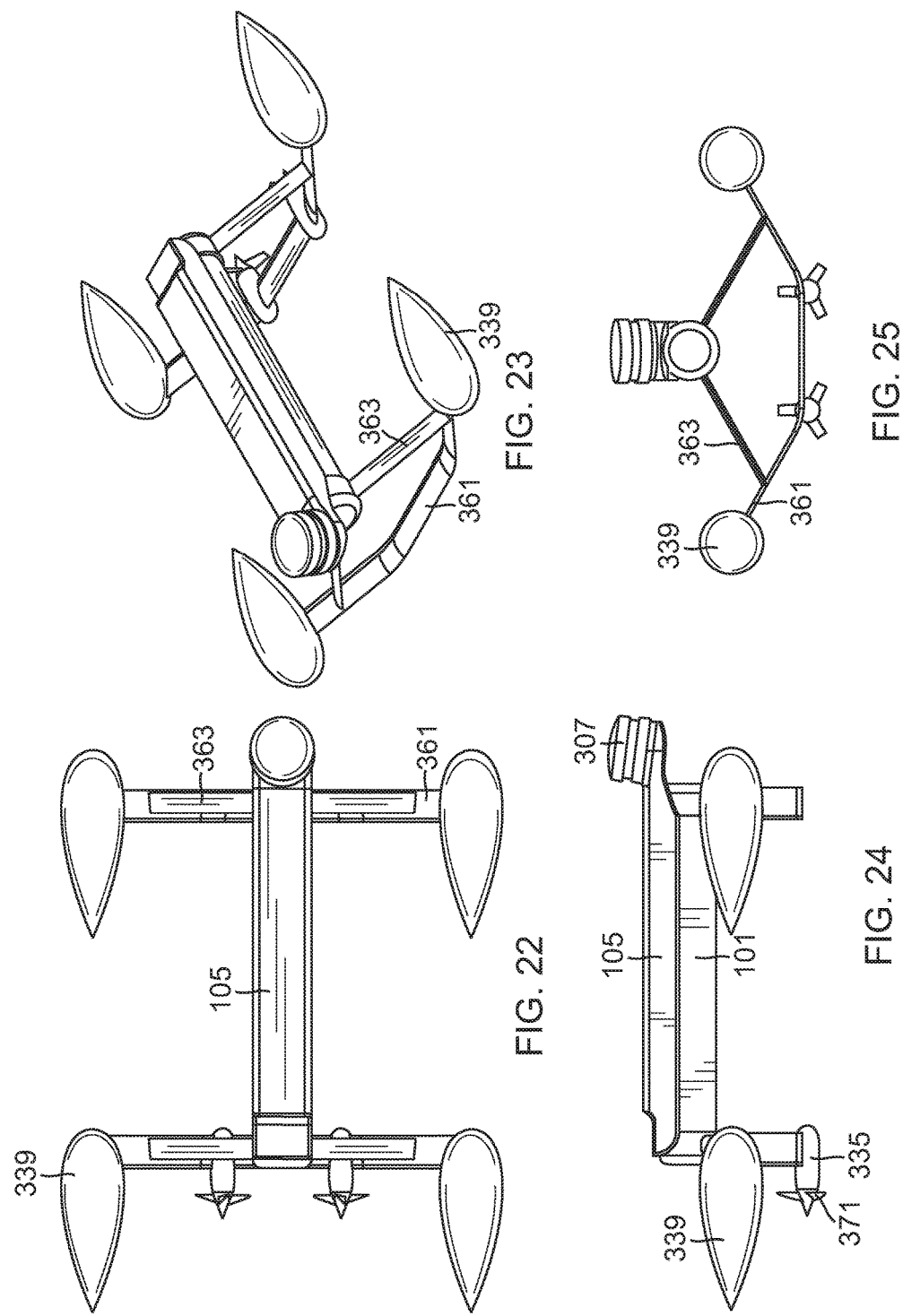

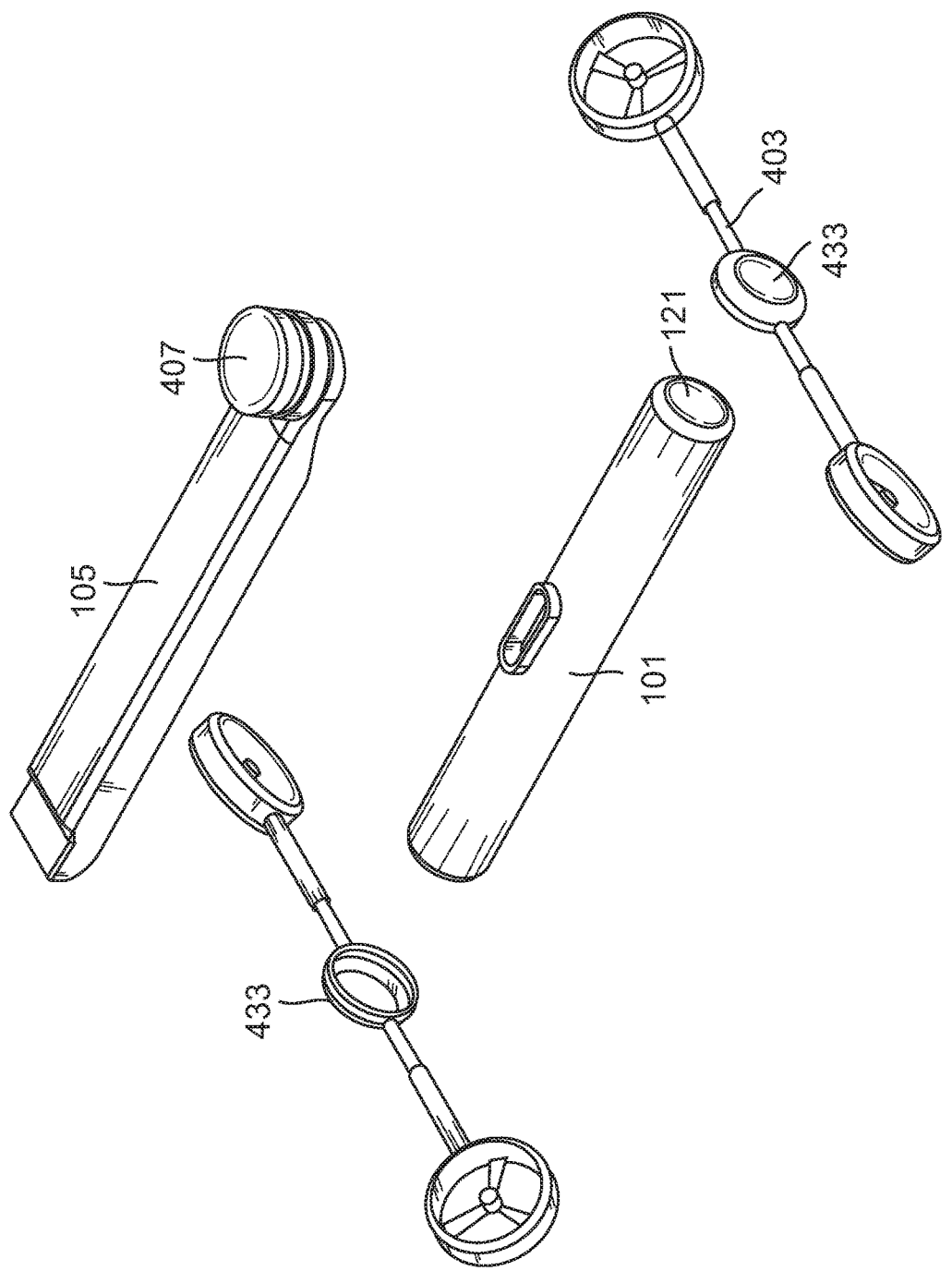

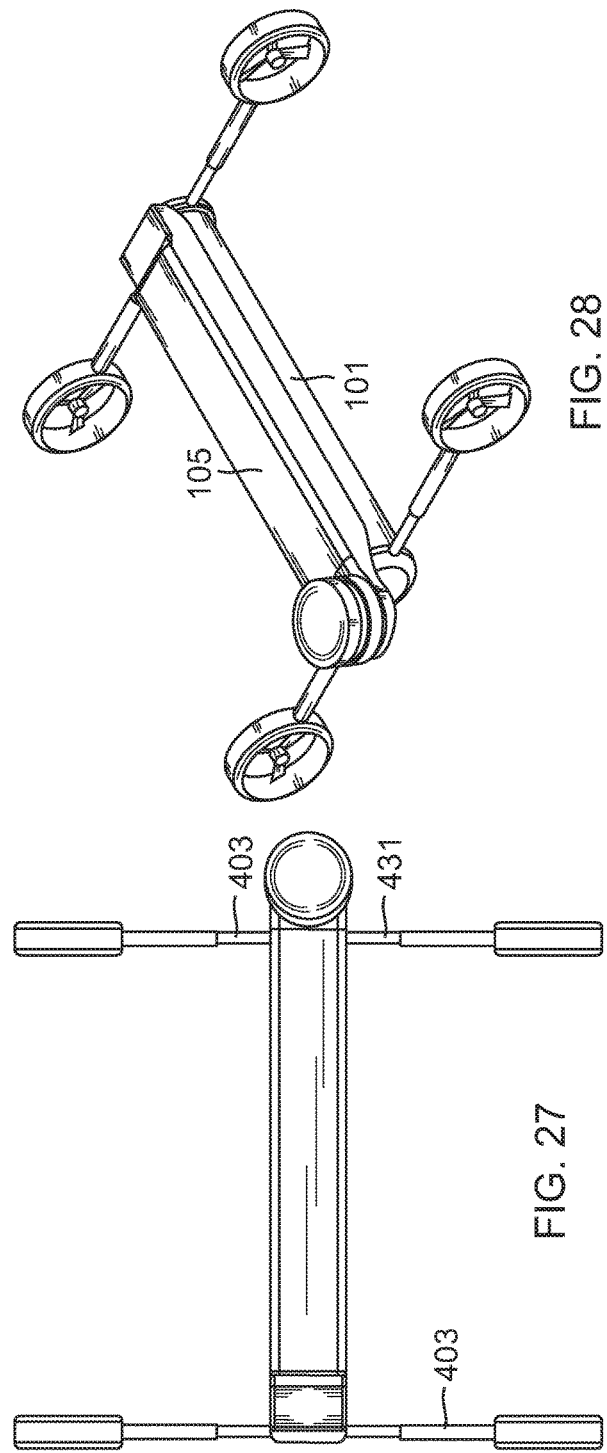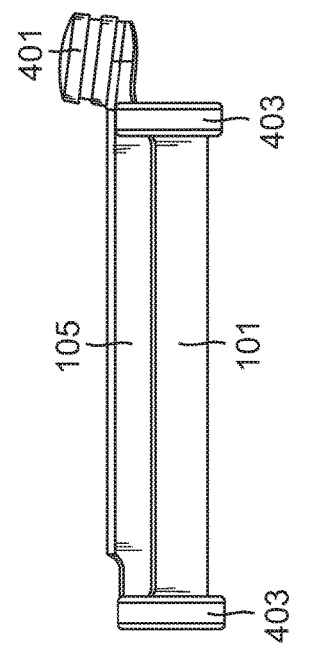

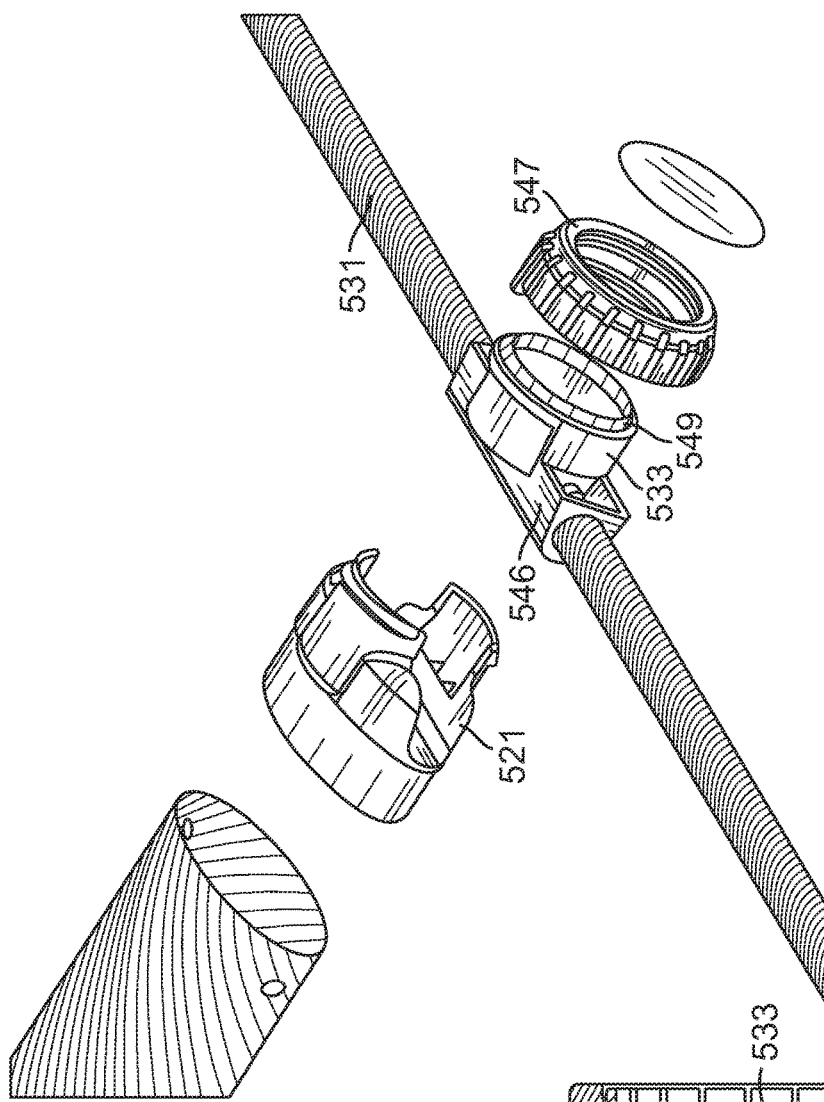
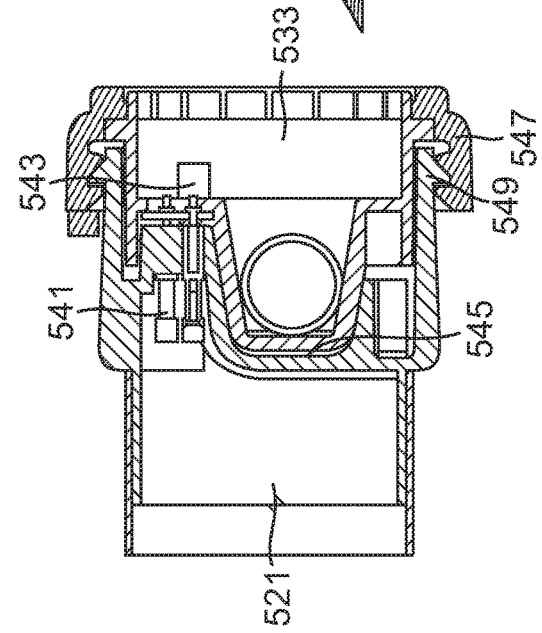
FIG. 35
FIG. 34

RECONFIGURABLE BATTERY-OPERATED VEHICLE SYSTEM

This application is a Continuation application of U.S. patent application Ser. No. 13/694,388, filed Nov. 26, 2012, which is a Continuation application of International PCT Application No. PCT/US2011/000953, filed May 26, 2011, which claims the benefit of U.S. Provisional Application No. 61/399,168, filed Jul. 7, 2010, and U.S. Provisional Application No. 61/396,459, filed May 26, 2010, each of which are incorporated herein by reference for all purposes.

The present invention relates generally to an unmanned, battery-operated vehicle (e.g., a UAV) and, more particularly, to a battery-operated vehicle that can be reconfigured for a wide variety of purposes.

BACKGROUND OF THE INVENTION

Quadrotor UAVs (unmanned aerial vehicles) are typically characterized by a center body having four arms coming out laterally in an X configuration (when viewed from above). Each arm supports one helicopter-type rotor directed upward. Typical control for a quadrotor aircraft is accomplished by varying the speed of each rotor, which typically is counter-rotating with respect to the rotors on either side of the rotor (and rotating in the same direction as the rotor on the opposite side).

For example, hovering is accomplished by having pairs of opposite corner blades operating together, in a rotational direction opposite of the other blades, and at equal speeds. Yawing is accomplished by relatively speeding up one opposing-corner pair with respect to the other, while pitch and roll is accomplished by relatively varying the speed of adjacent pairs of blades. Forward, reverse and side-to-side motion is accomplished by tilting the craft in pitch or roll to cause the sum of the forces of the motors to include a lateral component. Various other control protocols are known in the art.

A typical battery-operated unmanned vehicle is characterized by a primary structural body member (e.g., a fuselage) into which all of the command and control hardware and software are individually, integrally or removably attached. The batteries are typically provided in a lightweight package such as a shrink-wrap tube, which is removably received into a battery slot of the fuselage. The fuselage typically provides structural support and protection to the batteries once they are received in the battery slot.

Lithium batteries are typically considered a preferred battery type. Due to the risks in shipping lithium batteries, there are strict Department of Transportation requirements on shipping containers for lithium batteries and battery packs (i.e., groups of interconnected batteries). A copy of the UN Manual of Test and Criteria, $4^{th}$ Revised Edition, Lithium Battery Testing Requirements is incorporated herein by reference for all purposes. Because of the strict shipping requirements for lithium batteries, robust shipping containers meeting the shipping requirements are typically used for carrying multiple batteries and/or battery packs during shipping.

Once the shipping is completed and the batteries are disseminated to end users, the batteries and/or battery packs may lose the protection of the robust packing container, and be subject to damage until they are installed into their respective vehicles. Typically, each battery pack is both specifically configured for and provided to a single type of vehicle or device. Thus, the provision of batteries is susceptible to damage, and meeting shipping requirements can be challenging when a wide array of battery types must be shipped.

Accordingly, there has existed a need for a battery-operable vehicle system in which batteries are not vulnerable to damage when unprotected by shipping containers, and which they may be freely usable by a multitude of vehicles and other devices. Preferred embodiments of the present invention satisfy these and other needs, and provide further related advantages.

SUMMARY OF THE INVENTION

In various embodiments, the present invention solves some or all of the needs mentioned above, providing a battery-operable vehicle system in which batteries are not vulnerable to damage when unprotected by shipping containers, and which they may be freely usable by a multitude of vehicles and other devices as primary structural members.

In one aspect, an unmanned vehicle of the present invention may be configured for a range of missions, by including a body forming a battery module, a control module and one or more propulsion modules. The battery module provides a battery capacity adequate to provide motive force for the vehicle over the range of missions. The battery module has a plurality of structural and electronic connection ports for connecting other components. The control module includes a control system configured to control the operation of the vehicle, and is directly and removably connected to the battery module via a first connection port of the plurality of connection ports. The propulsion modules each include a motor configured to provide propulsive force to move the vehicle through one or more missions of the range of missions, and are directly and removably connected to the battery module via additional connection ports of the plurality of connection ports.

Advantageously, this configuration, in which the propulsion modules and control module each connect to the battery module, provides for the battery module to be the primary structural member of the vehicle, carrying the structural loads between the propulsion modules, and supporting the (generally very light) control module and payload. Because of the robust structure of the battery module, it may be designed to meet strict transportation requirements for batteries. The use of this robust battery module as the primary vehicle structure avoids the need for using two robust structures—one for the battery (for safe transportation), and another for a separate vehicle body.

In another aspect of the invention, a first set of propulsion modules may each include two substantially vertically oriented propellers at opposite ends of an arm, with a centrally (on the arm) located connector. A second set of propulsion modules may each include two wheels at opposite ends of an arm, with a centrally (on the arm) located connector. A third set of propulsion modules may each include two floats at opposite ends of an arm, a motor driven prop, and a centrally (on the arm) located connector. A fourth set of propulsion modules may each include two pitch-controlled props at opposite ends of an arm, with a centrally (on the arm) located connector. Advantageously, the vehicle may convert between a quadrotor aircraft, a wheeled ground vehicle, a water-surface vehicle, and a submersible vehicle simply by changing the type of propulsion module attached to the battery module.

In yet another aspect of the invention, the vehicle forms a quadrotor aircraft having four propellers that each angled slightly toward a front end of the vehicle. This pitched-down configuration makes the aircraft pitch up to hover, while it allows a cruising forward flight with the battery and control modules substantially level. Advantageously, this maximizes backward viewing during hovering, while minimizing air resistance during cruise flight.

In another aspect of the invention, each propulsion module is interchangeably usable at either end of the vehicle. Thus, a single replacement propulsion module may be used to replace either a broken front propulsion module or a broken back propulsion module.

In yet another aspect of the invention, the arms connect to the battery module on opposite longitudinal ends of the body. Each arm connector is configured with an end cap affixed to its respective arm. Each body connector is configured with a groove adapted to conformingly and longitudinally receive the arm when the arm connector is connected to the body connector. The body connector groove is configured to directly bear all vertical loads from the arm connector arm without loads being carried by the arm connector end cap. As a result, the primary structural forces substantially transfer directly between the arm and the battery unit, and the end caps do not need to be as robust as the arms themselves. This saves on weight, and provides for a more reliable structure.

Other features and advantages of the invention will become apparent from the following detailed description of the preferred embodiments, taken with the accompanying drawings, which illustrate, by way of example, the principles of the invention. The detailed description of particular preferred embodiments, as set out below to enable one to build and use an embodiment of the invention, are not intended to limit the enumerated claims, but rather, they are intended to serve as particular examples of the claimed invention.

BRIEF DESCRIPTION OF THE DRAWINGS

FIG. 3 is a perspective view of a ruggedized, integral-battery, load-bearing body of the UAV of FIG. 1.

FIG. 4 is an end view of the ruggedized, integral-battery, load-bearing body of FIG. 3.

FIG. 5 is a perspective view of a UAV propulsion arm of the UAV of FIG. 1.

FIG. 6 is a rear view a connection module of the UAV propulsion arm of FIG. 5.

FIG. 7 is a schematic top view of the UAV depicted in FIG. 1.

FIG. 8 is a top view of a control module of the UAV of FIG. 1, with the upper surface treated as translucent.

FIG. 9 is a bottom view of the control module depicted in FIG. 8, with the lower surface treated as translucent.

FIG. 14 is an exploded perspective view of the UAV depicted in FIG. 1.

FIG. 15 is a perspective view of a UAV propulsion arm of the UAV of FIG. 1.

FIG. 16 is a perspective view of a UGV propulsion arm usable to convert the UAV of FIG. 1 into the UGV of FIG. 17.

FIG. 17 is a perspective view of the UAV of FIG. 1 converted into a UGV.

FIG. 21 is an exploded perspective view of the UAV of FIG. 1 converted into a USV.

FIG. 22 is a top view of the USV of FIG. 21.

FIG. 23 is a perspective view of the USV of FIG. 21.

FIG. 24 is a side view of the USV of FIG. 21.

FIG. 25 is a front view of the USV of FIG. 21.

FIG. 26 is an exploded perspective view of the UAV of FIG. 1 converted into a UUV.

FIG. 27 is a top view of the UUV of FIG. 26.

FIG. 28 is a perspective view of the UUV of FIG. 26.

FIG. 29 is a side view of the UUV of FIG. 26.

FIG. 30 is a front view of the UUV of FIG. 26.

FIG. 34 is a partial cross-sectional view of a connection between the body of the UAV depicted in FIG. 31 and a propulsion module of the UAV depicted in FIG. 31.

FIG. 35 is an exploded partial perspective view of the connection depicted in FIG. 34.

DETAILED DESCRIPTION OF THE PREFERRED EMBODIMENTS

The invention summarized above and defined by the enumerated claims may be better understood by referring to the following detailed description, which should be read with the accompanying drawings. This detailed description of particular preferred embodiments of the invention, set out below to enable one to build and use particular implementations of the invention, is not intended to limit the enumerated claims, but rather, it is intended to provide particular examples of them.

Figure 1:
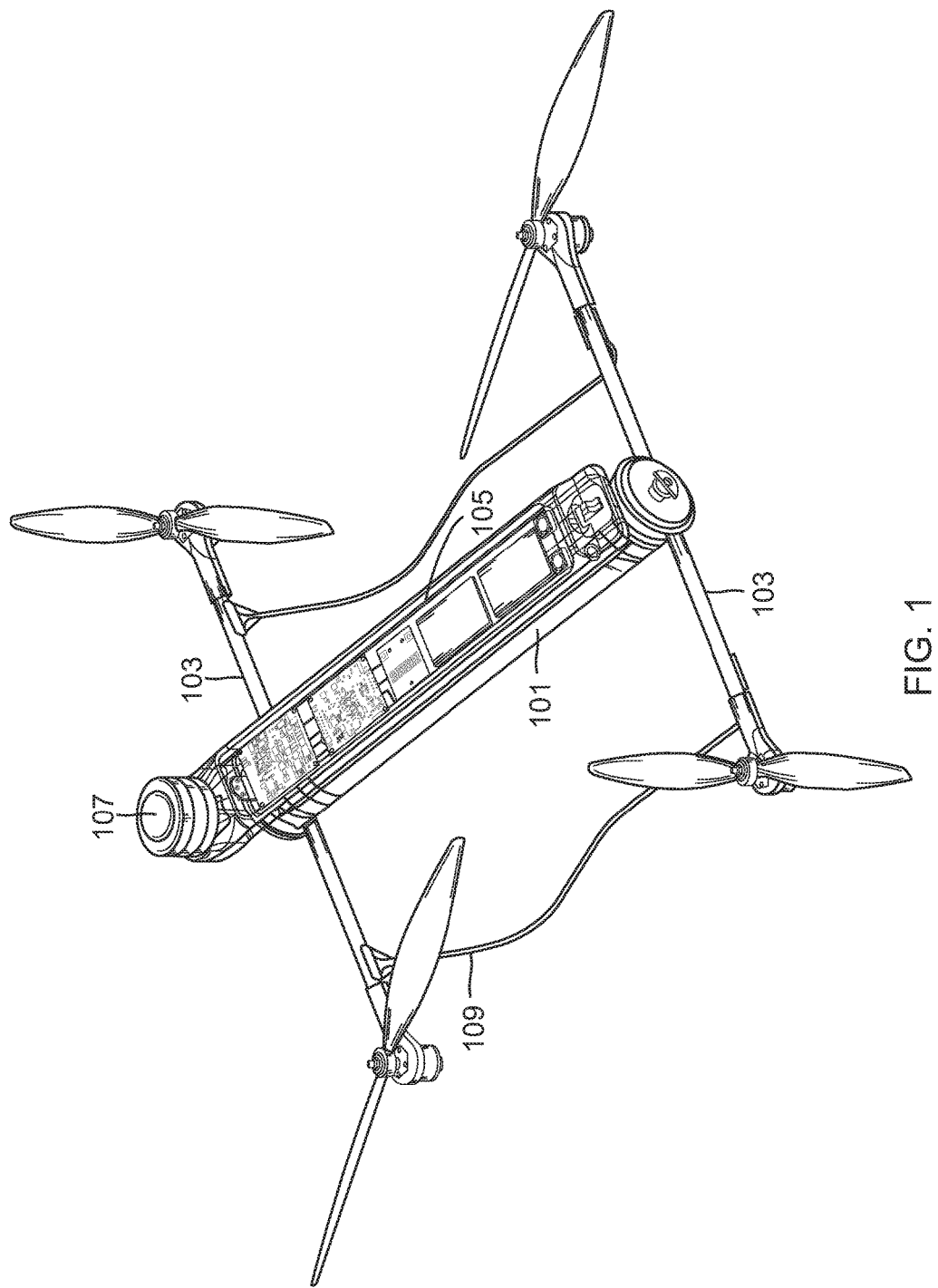
FIG. 1 is a perspective view of a UAV (unmanned aerial vehicle) embodying the present invention.
Figure 2:
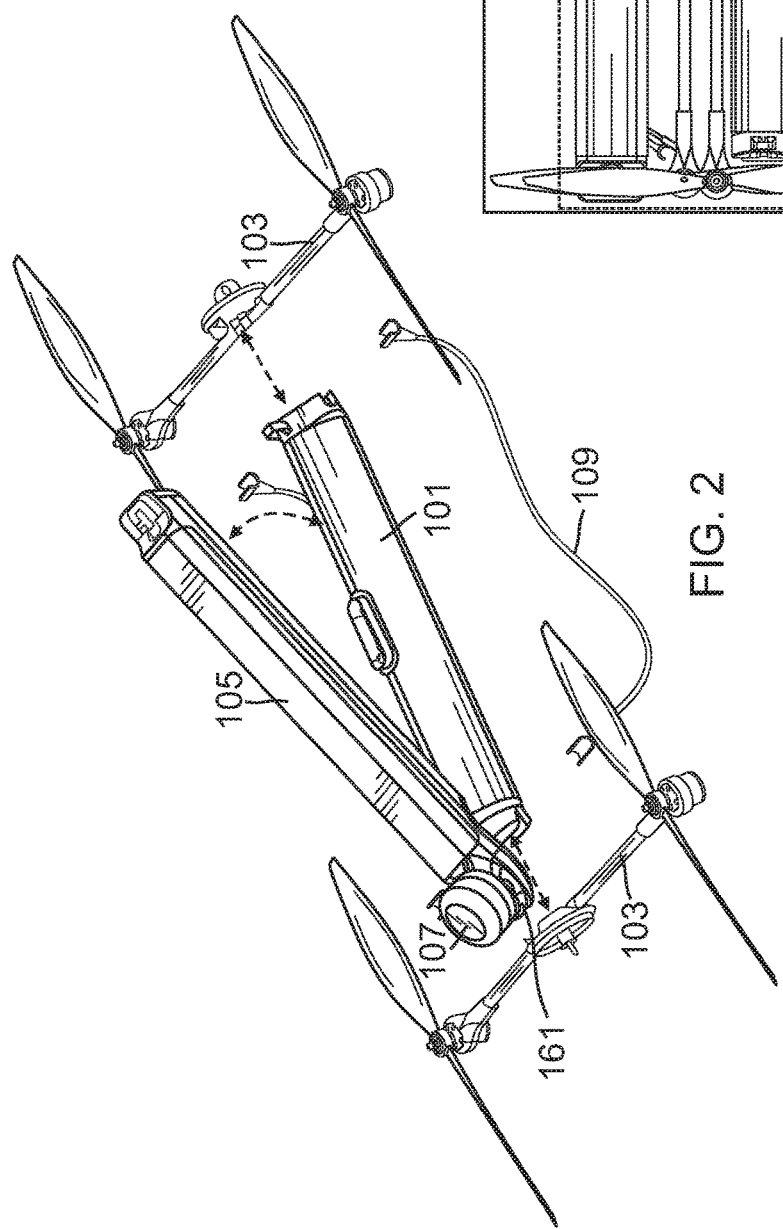
FIG. 2 is an exploded perspective view of the UAV depicted in FIG. 1.

With reference to FIGS. 1 & 2, the first embodiment of the invention includes a body 101 configured both as a battery and as a primary structural element for the vehicle, two UAV (Unmanned Aerial Vehicles) propulsion arms 103, a control module 105, a payload module 107 and two landing gear 109.

With reference to FIGS. 1-3, the body 101 is a multifunctional battery structure configured to work as the core vehicle structure for a variety of vehicles. The body includes a round (cylindrical) carbon tube structure 111, and integrally contains a plurality of interconnected (in parallel) stacks of in-series lithium battery cells 113 forming a smart lithium battery (i.e., battery pack of one or more batteries and a battery board forming a battery controller). The structure of the body meets all necessary shipping requirements for shipping the batteries integrally contained within the body, and in particular, the UN Manual of Test and Criteria, 4$^{th}$ Revised Edition, Lithium Battery Testing Requirements, which is incorporated herein by reference for all purposes, and thus any shipping container carrying one or more of the bodies (i.e., the batteries) would only have standard container shipping requirements.

The battery controller tracks battery usage, battery charging, monitors battery temperature via gages incorporated into the structure of the battery, and conducts other battery functions as are known for a smart battery. The round shape of the body provides for high strength and rigidity. The body also incorporates a large fuse, and all battery heat is dissipated passively.

The body includes three connectors, including two side connectors 121 and an intermediate connector 123. The two side connectors are positioned at the longitudinal ends of the cylindrical body, and are each configured for structurally and electronically connecting to a propulsion arm 103. The intermediate connector is centrally located along the length of the body, and is configured for electronically connecting to the control module 105. The intermediate connector is reinforced so as to maintain the strength and rigidity of the body despite the opening that it provides for the electronic connection. The intermediate connector includes a spring 124 extending up to make an initial ground contact prior to connection between functional electrical connectors. The intermediate connector's central location helps to minimize the weight of wires running between the batteries.

With reference to FIGS. 3-6, each UAV propulsion arm includes a carbon tube support rail 131, an arm connection module 133 in the center of the support rail, a pair of motors 135, a pair of motor mounts 137, each being at a longitudinal end of the support rail, and each mounting one of the motors to the support rail, and a pair of propellers 139, each being affixed to one of the motors such that that motor can drive its respective propeller in rotation with respect to the support rail. The connection module may include a dual motor controller configured to control the operation of the two motors. Alternatively, separate motor controllers may be incorporated into each motor mount. The propellers are large enough to extend back almost to the connection module, and the overall system is configured to blow air down over the various parts of the propulsion arm and thereby providing any cooling that might be needed. The motors can be operated at different speeds (including operating in reverse) to control the craft.

The connection module 133 of each arm is configured for connection to either of the two side connectors 121 of the body, forming an end cap for either end of the body. That connection includes mated electronic connectors (a side connector electronic connector 141 and a connection module electronic connector 143) for passing power, control signals, and the like. That connection further includes a groove 145 in each side connector, that groove being configured to conformingly receive a portion (and possibly a majority) of the circumference of the support rail 131 such that significant vertical and torsional loads may pass between the support rail and the side connector without being significantly carried by the connection module 133. The connection module connects to its respective side connector via a thumb screw 147 in the connection module that is received in a threaded hole 149 in the side connector, thereby longitudinally holding the support rail onto the side connector and in the groove.

As is depicted in FIG. 7, each propulsion arm will have one clockwise-rotating propeller one counterclockwise-rotating propeller. Because the connection modules 133 are configured to connect to either side connector 121, the propulsion arms 103 may connect to either end of the body 101, and only one spare propulsion arm is needed to serve as a replacement part for the two primary propulsion arms. It is anticipated that most deflection during flight loading occurs in the propulsion arms, which are significantly smaller in diameter than the body. As a result, the propulsion arms are a weaker link, and will likely break first under extreme loading.

With reference to FIGS. 2, 3, 8 and 9, the control module 105 typically contains most all command and control equipment. This may include one or more printed circuit boards having antennas, sensors and processing functionality for GPS/INS (Global Positioning System/Inertial Navigation System) control, autopilot functionality, as well as controls and processing for a variety of different payloads. Each piece is positioned for efficient connectivity and to limit wire weight. Typically the GPS/sensor board will be in back, while the autopilot (which must communicate with the propulsion arms) is in the center. The payload board is up front, by the payload.

The control module 105 removably attaches to two handles 152 on the body 101 via a mated hook 151 and latch 153 system at the longitudinal ends of the control module and body. Electronic connections are provided by mated electronic connectors (a command connector 155 on the command module, connecting to the intermediate connector 123 of the body 101) for passing power, control signals, and the like between the control module and the body.

Figure 10:
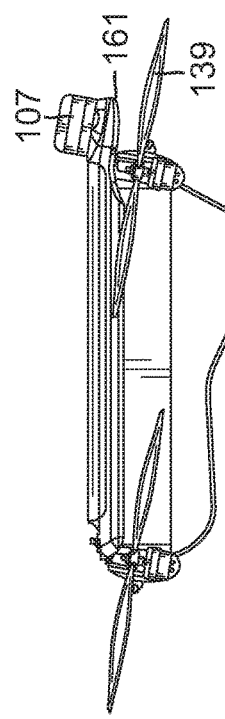
FIG. 10 is a side view of the UAV depicted in FIG. 1, as oriented for forward flight.
Figure 11:
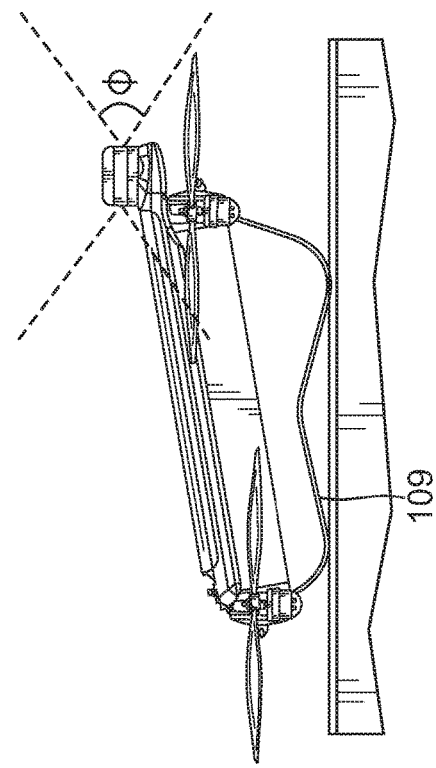
FIG. 11 is a side view of the UAV depicted in FIG. 1, as oriented for hovering or landed.
Figure 12:
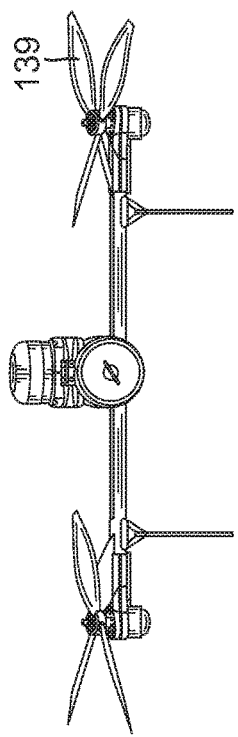
FIG. 12 is a front view of the UAV depicted in FIG. 10.
Figure 13:
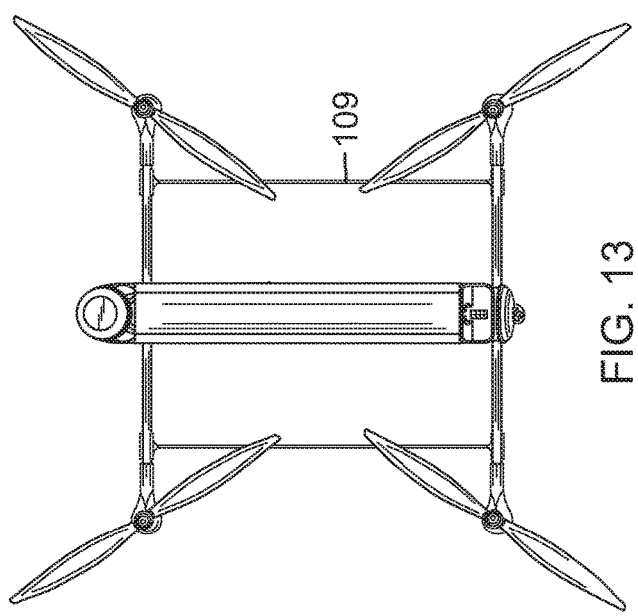
FIG. 13 is a top view of the UAV depicted in FIG. 10.

The payload module 107 attaches to a front end 161 of the control module at a slight offset (i.e., pitched down, as shown in FIG. 10) angle (typically on the order of 10 degrees). A variety of different payload modules may be interchangeably used. These modules may include IR (Infrared), EO (Electro Optical), daytime and/or nighttime cameras, as well as other equipment for tracking, targeting and/or communication functions. A mating connector system both structurally and electronically links the payload module to the control module, providing for electronic communication and power exchange with the control module.

Compared to the other modules (e.g., the body 101 and propulsion arms 103), the control module 105 may be quite expensive due to its significant electronics and software. The other units may therefore be considered fairly expendable in comparison. Advantageously, the control module only carries very low loads (e.g., its own weight and the weight of the payload module), and may therefore be made very lightweight. Because of the control module's position on top of the body, and because the body protects the control module from high loading (by connecting at both ends and the middle), the control module can function as a very robust and durable device without requiring its own robust structural elements.

With respect to FIGS. 10-13, while being oriented in a general upward direction, each propeller is angled slightly toward the front end 161 at a slightly offset pitch angle downward from level (on the order of 10 degrees, see, e.g., FIG. 10). Because of this configuration, the UAV hovers at a slight nose-up pitch angle (on the order of 10 degrees, see, e.g., FIG. 11), which compensates for (i.e., levels) the slight offset angle of the payload and partially removes the rear end of the control module from extending into the rearward and downward looking view of the payload. In a typical embodiment, the payload might be expected to have 360 degree viewing capabilities with a +/−25 degrees tilt angle for digital zooming.

In this embodiment, the forward pitching of the propellers is not achieved via a variation in the propulsion arm. Instead, the side connectors 121 are slightly angled (on the order of 10 degrees) in a pitched down direction. It should thus be recognized that while the propulsion arms are not end specific, the body 101 defines a front and a rear by the angling of the end connectors. Moreover, while the craft can fly in any direction, flight in the forward direction will typically be more efficient. It should also be recognized that the control module attaches to the body 101 with the front end 161 of the control module 105 at the front end of the body, thus placing the payload module at the front end of the body. The hook, the latch, and their respective handles have different configurations to avoid attempts to attach the control module backwards.

In forward flight at a cruise speed (see, FIGS. 10 & 12), the aircraft is pitched down from the hover orientation to be in level flight such that each of the propellers is providing both lift and thrust in the direction of the front end 161 of the control module. Because the flight occurs in a level orientation of the body (rather than angled as a typical quadrotor would do), it flies forward with only a minimal wind resistance along its body.

The propellers are typically the only moving primary parts (or control surfaces) on the UAV of the present invention. Nevertheless, other moving parts may include cooling-fan motors in the control module, and positioning devices for reorienting the camera(s) within the payload.

Each of the two UAV landing legs 109 extend between the two propulsion arms 103. These legs are configured as skids, and are configured to support the craft at an angle to provide for the landed craft to be angled with the same upward angle as would be used for hovering. Advantageously, this provides for smooth vertical take-offs, as well as allowing the craft to land on a tall, level object in the proper orientation for the payload to perch and stare down at a target.

Figure 19:
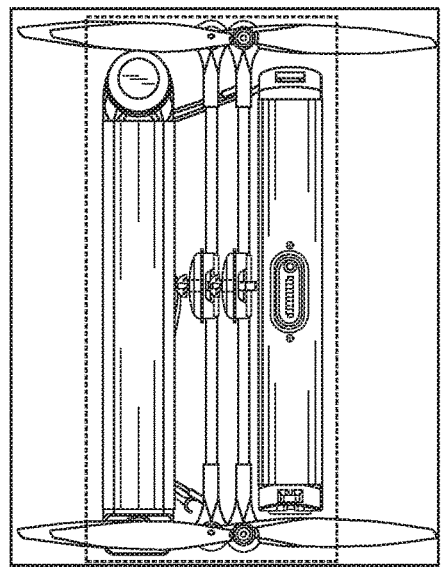
FIG. 19 is a top view of the UAV depicted in FIG. 1, as packaged for carrying in a container.
Figure 20:
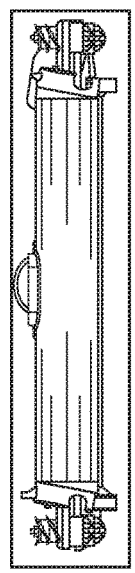
FIG. 20 is a front view of the packaged UAV depicted in FIG. 19.

To assemble the UAV from a configuration with all elements packed in a carrier (see, e.g., FIGS. 19 and 20), the battery unit (the body) is removed from the carrier. The propulsion arms are then removed from the carrier and affixed to the ends of the body. More particularly, each propulsion arm is snapped into place and its thumb screw is tightened down. The landing gear is then removed from the carrier and affixed appropriately to the propulsion arms. The command module is then removed from the carrier, hooked onto the handle at the front end of the body, and swung down so that the connectors mate and the latch locks into place at the rear end of the body. Finally, the payload is snapped or clipped into place.

Figure 18:
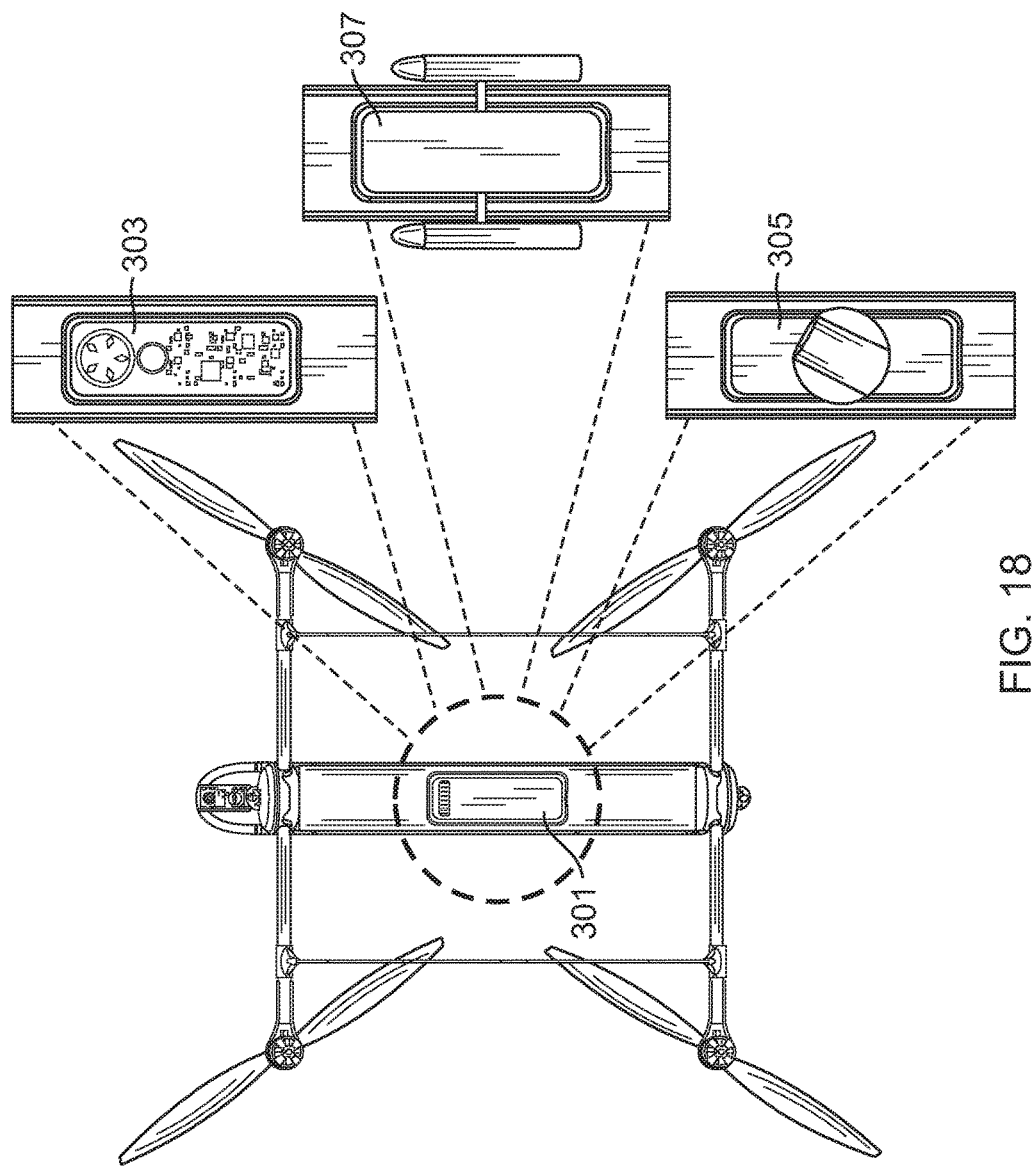
FIG. 18 is a representation of several variations of the UAV depicted in FIG. 1.

With reference to FIG. 18, other payload configurations are within the scope of the invention (for the various embodiments described herein). For example, either using the previously disclosed payload module, or an optional lower payload tray 301, scientific payloads 303 such as acoustic or other SIGINT (signals intelligence) sensors and/or transmitters, advanced ISR (intelligence, surveillance and reconnaissance) sensors 305 (e.g., battlefield mapping), and other such payloads 307 (e.g., munitions and droppable payloads).

In addition to using the body, the control module and payload module for a quadrotor UAV, other possible uses and configurations of this embodiment may be provided. With reference to FIGS. 14-17, the UAV propulsion arms 103 may be replaced with a pair of wheeled UGV (unmanned ground vehicle) propulsion arms 203. As before, the propulsion arms are made from carbon tubes forming a support rail 231, and include motors 235 and motor controllers (in addition to wheels 239). The UGV propulsion arm also includes a connection module 233 that connects to either side connector 121 (i.e., at either end of the body), so a spare UGV propulsion arm can be used to replace either active UGV propulsion arm.

The motor controller software differs, but is contained in the propulsion arm, so that distinction is invisible to the control module. As before, there can be a dual motor controller, such as in the connection module 233, or there can be separate controllers for and by each motor. The motors can be operated at different speeds (including operating in reverse) to directionally control the craft.

The propulsion modules are plug-and-play, and the control module 105 can sense which propulsion modules are attached, and thereby make any necessary distinctions in its control commands that it sends to the attached propulsion arms 103/203. The same payload 107 might be usable, or a separate UGV payload 207 having a different orientation might be preferred (to compensate for the level viewing angle and to provide a more upward-looking view). If the UGV is provided with large enough wheels and a GPS antenna that can read in an inverted direction, it is possible for the UGV to be configured to operate eve if it is turned upside down. The method of assembling the UGV is similar to that of the UAV, with the exception that no landing gear need be installed.

With reference to FIGS. 21-25, another possible configuration of this embodiment is provided by replacing the UAV (quadrotor) propulsion arms 103 or UGV propulsion arms 203 with a pair of USV (Unmanned Surface Vehicle) propulsion arms 303. To minimize drag and improve stability, each propulsion arm is made from a plurality of aerodynamically shaped (in the direction of propulsion) carbon tubes forming support rails 331. The aerodynamic shaping is adapted to minimize the cross section of the support rails in a direction of travel (see, e.g., FIG. 25).

The support rails include a primary rail 361 and two legs 363 that connect the primary rail to a connection module 333. Each primary rail carries a float 339 at each of its two ends. The primary rail of at least one (and possibly both) propulsion arms also carries one or more motors 335 (e.g., two), each of which drives a prop 371 to produce thrust. Each propulsion arm includes one or more motor controllers (in addition to motors). The propulsion arm connection module 333 connects to either side connector 121 (i.e., at either end of the body 101). The primary rail is configured to extend the motors into a body of water (e.g., below the surface of the water) while the floats support the USV on the surface of the water. Optionally, the floats and motors may be configured so a spare propulsion arm can be configured to work on either side of the body.

The motor controller software differs, but is contained in the propulsion arm, so that distinction is invisible to the control module. As before, there can be a dual motor controller, such as in the connection module 333, or there can be separate controllers for and by each motor. The motors can be operated at different speeds (including operating in reverse) to directionally control the craft.

The control module 105 senses which propulsion modules are attached, and thereby make any necessary distinctions in its control commands that it sends to the propulsion arms 303. The same payload 107 might be usable, or a separate USV payload 307 having a different orientation might be preferred (to compensate for the level viewing angle and to provide a more upward-looking view). The method of assembling the USV is similar to that of the UGV. Each of the connectors has seals that protect all electrical connections from contact with water, and each of the modules is water tight.

With reference to FIGS. 26-30, another possible configuration of this embodiment is provided by replacing the UAV (quadrotor) propulsion arms 103, UGV propulsion arms 203, or USV propulsion arms 303, with a pair of UUV (Unmanned Underwater Vehicle) propulsion arms 403. As before, the propulsion arms are made from carbon tubes forming a support rail 431. At each of two ends of the support rail, the propulsion arm includes a propulsion motor 435 that drives a prop 471, and an aiming motor 473 that independently rotates its respective prop and propulsion motor around a longitudinal axis of the support rail (to pitch the motor). The propulsion arm again includes a connection module 433 that connects to either side connector 121 (i.e., at either end of the body 101), so a spare propulsion arm can be configured to work on either side.

Each propulsion arm includes one or more motor controllers (in addition to the various motors). The motor controller software differs, but is contained in the propulsion arm, so that distinction is invisible to the control module. There can be a dual (or even a quad) motor controller in each arm, such as in the connection module 433, or there can be separate controllers for and by each motor. The motors can be operated at different speeds (including operating in reverse) to control the craft.

The control module 105 can sense which propulsion arms are attached, and thereby make any necessary distinctions in its control commands that it sends to the propulsion arms 403. The same payload 107 might be usable, or a separate UUV payload 407 having a different instrumentation appropriate to the underwater environment. The method of assembling the UUV is similar to that of the USV. Each of the connectors has seals that protect all electrical connections from contact with water, and each module is sealed to prevent water from getting in.

Any combination of the above-described vehicles forms a man-packable, reconfigurable vehicle system with many common core parts, under the present invention. Because of the common elements, the expense of the control module can be limited to a single unit (or a limited number if spares are maintained), even as a multitude of different vehicles are available for use. The system may be provided with only one battery for all vehicles, or a plurality of battery units. Common spare parts, payloads, battery charger and ground control station (including a ruggedized computer) simplify the system's portability and use. The vehicle system is quickly convertible from one vehicle configuration to another, and a single set of vehicle components can be easily swapped from one battery unit to another to allow for semi-continuous use while battery recharging occurs. The control module can easily identify the vehicle configuration and adapt to use the proper control protocols, and a single GCS (ground control system) can be used for controlling and communicating with the different vehicle types.

The vehicle system may also be configured for multivehicle operation. For example, ground and water based vehicles (UGVs, USVs and UUVs) might require airborne relay of communication signals for increased range. The vehicle system may be configured for coordinated control of a UAV along with a UGV, USV or a UUV (optionally using a follow-me mode of operation) to provide that airborne relay. Likewise, for explosive ordinance disposal, a UAV can investigate the area, while a UGV delivers an explosive to destroy the threat. Similarly, multiple vehicles of the same type (e.g., multiple UAVs) may be made to operate in unison, such as in a given flight configuration, through a search pattern to provide for faster search operations.

A wide variety of military and civilian missions are supportable by this efficient system, including many missions typically available to UAVs, UGVs, USVs and UUVs. Some such missions include tactical and covert surveillance, hover/perch and stare surveillance, special payload delivery, checkpoint security (including under-vehicle inspection), EOD (explosive ordnance disposal), team situational awareness, IED (improvised explosive device) inspection and destruction, costal surveillance, mine searching, indoor hover reconnaissance, fire fighting assessment and management, search and rescue activities, surveillance of public gatherings, riots, crime scenes, traffic accidents, traffic jams, and foot pursuits.

Alternative variations of the present invention could be provided with other configurations, such as an X-shaped configuration in which each rotor, wheel or prop connects separately to a single core. Nevertheless, the H-shaped configuration of the present embodiment tends to minimizes assembly time and complexity. It also provides for the convenient use of simple, tubular components with little aerodynamic cross-section. This also provides for the device to be rapidly disassembled and compacted into an easily cartable package, such as might be carried around by military personnel in the field (see, e.g., FIGS. 19 and 20).

Figure 31:
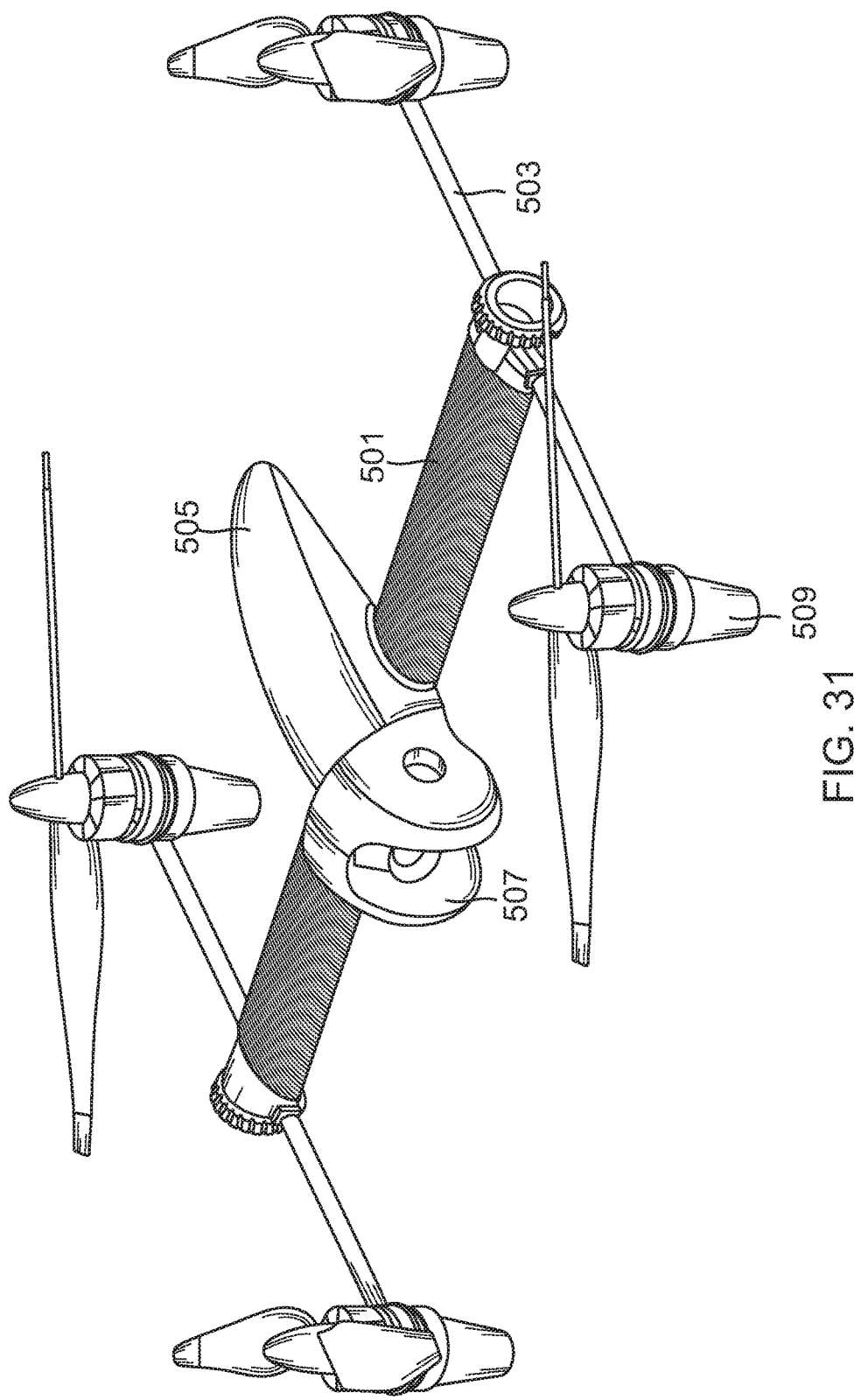
FIG. 31 is a perspective view of a second embodiment of a UAV embodying the present invention.
Figure 32:
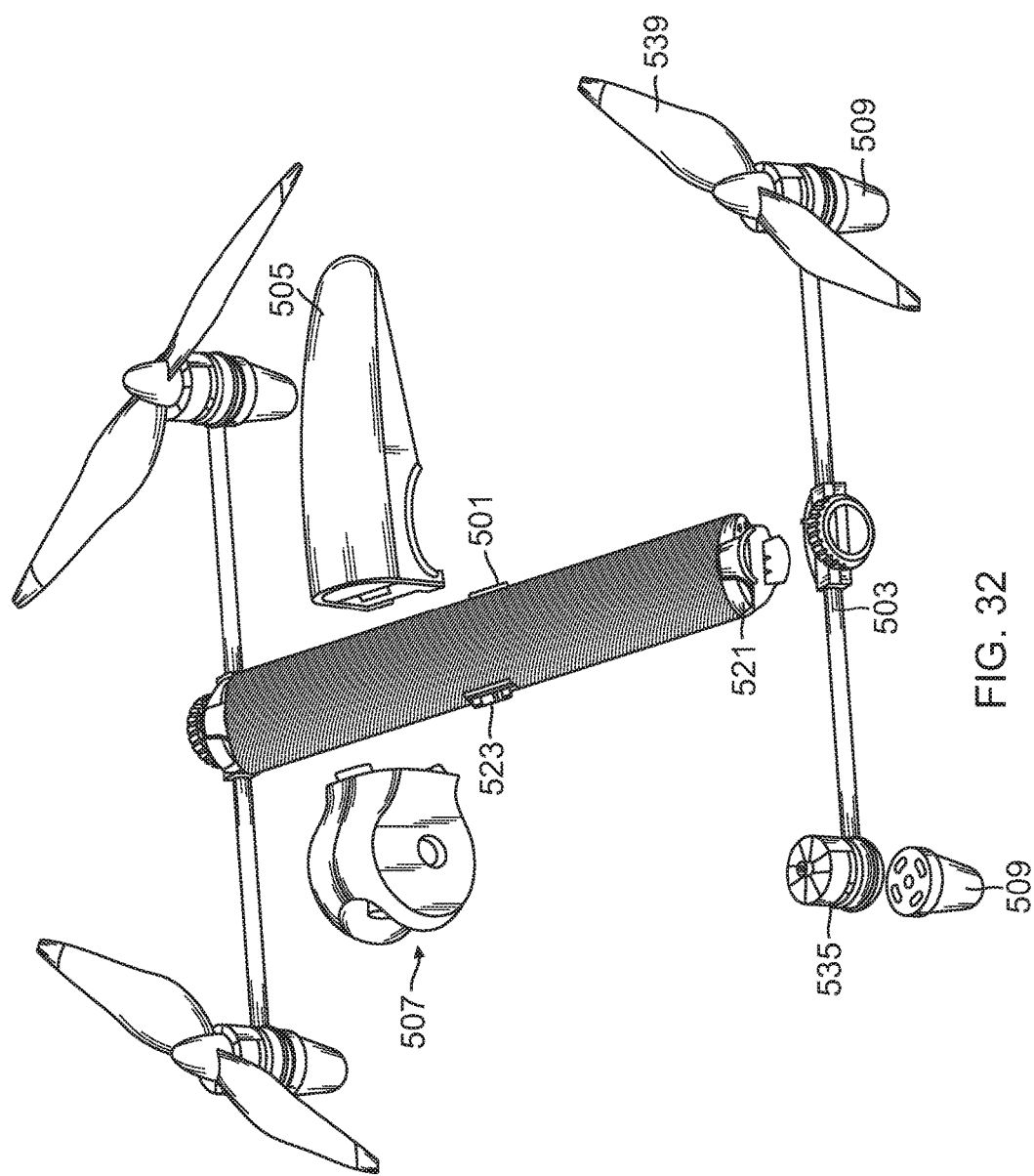
FIG. 32 is an exploded perspective view of the UAV depicted in FIG. 31.

With reference to FIGS. 31-32, in a second embodiment of the invention, the H configuration of the UAV is modified in a number of aspects. As before, this embodiment includes a body 501 configured both as a battery and as a primary structural element for the vehicle, two propulsion arms 503, a control module 505, and a payload module 507. Optionally, the payload and control modules may be integral, or may be stored in an attached state for fast assembly. In this embodiment, each propulsion module has and two landing gear 509, one affixed to each of its motors. In contrast to the first embodiment, the control module and payload are oriented for flight and observation in a direction perpendicular to the longitudinal direction of the body.

Figure 33:
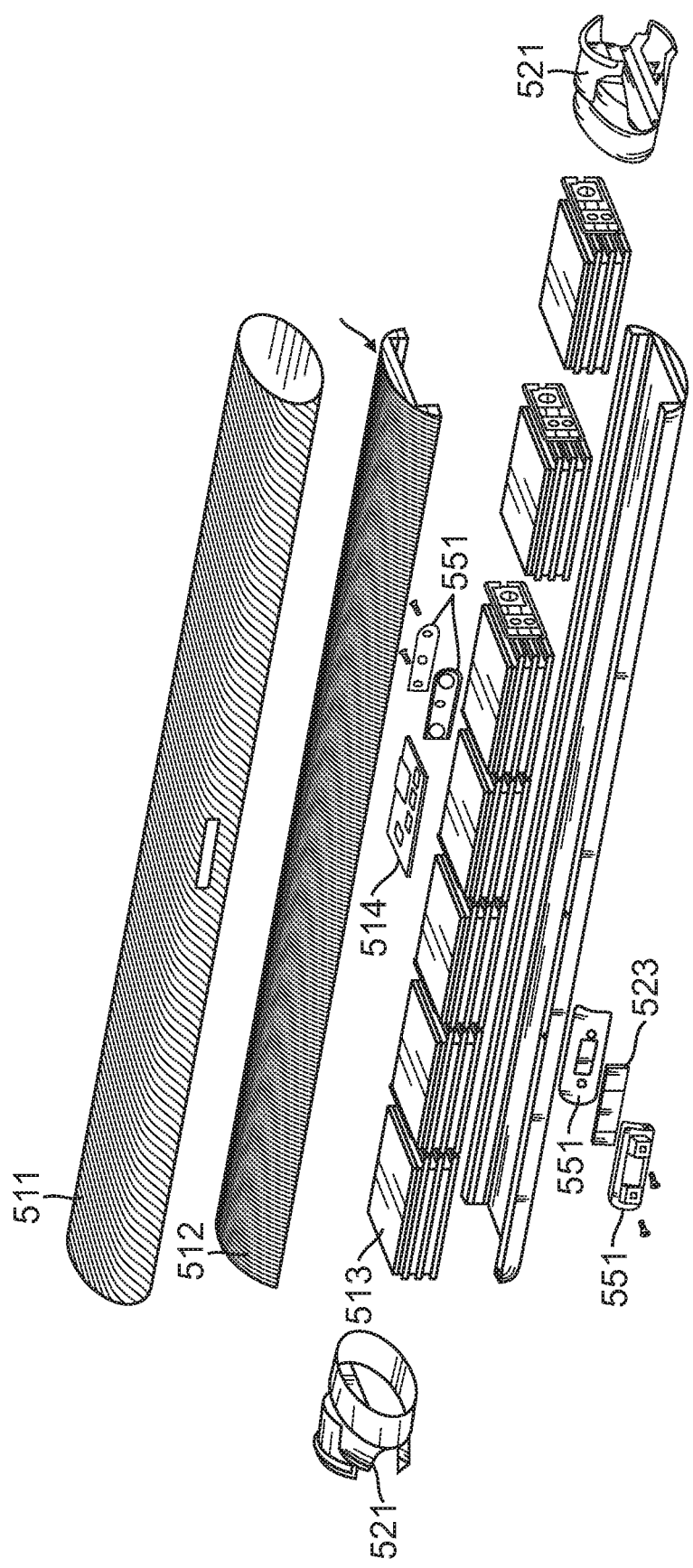
FIG. 33 is an exploded perspective view of a body that is part of the UAV depicted in FIG. 31.

With reference to FIGS. 31-33, the body 501 is configured with an elliptical cross section (across its longitudinal dimension) having its vertical measurement as its smallest dimension. This configuration trades some structural stiffness for a reduction in drag. The structure includes a molded carbon fiber casing 511 conformingly received around a foam core 512, which conformingly surrounds a plurality of interconnected stacks of lithium battery cells 513 forming a smart lithium battery (i.e., battery pack of one or more batteries and a battery board 514 forming a battery controller). Optionally, the structure of the body meets all necessary shipping requirements for shipping the batteries integrally contained within the body, and in particular, the UN Manual of Test and Criteria, $4^{th}$ Revised Edition, Lithium Battery Testing Requirements, and thus any shipping container carrying one or more of the bodies (i.e., the batteries) would only have standard container shipping requirements.

The battery controller tracks battery usage, battery charging, monitors battery temperature via gages incorporated into the structure of the battery, and conducts other battery functions as are known for a smart battery. The shape of the body provides for significant strength and rigidity. The body also incorporates a large fuse, and all battery heat is dissipated passively.

The body includes three connectors, including two side connectors 521 and an intermediate connector 523. The two side connectors are positioned at the longitudinal ends of the elliptical body, and are each configured for receiving a propulsion arm 503. The intermediate connector is centrally located along the length of the body, and is configured for electronically connecting to the control module 505. The intermediate connector is reinforced so as to maintain the strength and rigidity of the body despite the opening that it provides for the connection. The intermediate connector location (in the center) helps to minimize the weight of wires running between the batteries.

With reference to FIGS. 31-35, each UAV propulsion arm includes a support rail 531, an arm connection module 533, a pair of motors 535, each being at a longitudinal end of the support rail, and a pair of propellers 539, each affixed to one of the motors such that that motor can drive its respective propeller in rotation with respect to the support rail. The motors are exposed for effective cooling and simplified inspection.

The connection module 533 of each arm is configured for connection to either of the two side connectors 521 of the body. That connection includes mated electronic connectors (a side connector electronic connector 541 and a connection module electronic connector 543) for passing power, control signals, and the like. That connection further includes a wedge-shaped groove 545 in each side connector, that groove being configured to conformingly receive a wedge portion 546 of the connection module 533 to form a reliable, tight connection without slop or vibration. The connection module connects to its respective side connector via a captive nut screw 547 of the connection module that is received by a threaded section 549 of the side connector. The nut screw also extracts the motor boom when it is unscrewed.

Each propulsion arm will have one clockwise-rotating propeller one counterclockwise-rotating propeller. Because the connection modules 533 are configured to connect to either side connector 521, the propulsion arms 503 may connect to either end of the body 501, and only one spare propulsion arm is needed to serve as a replacement part for the two primary propulsion arms.

As in the first embodiment, the control module 505 typically contains most all command and control equipment. This may include one or more printed circuit boards having antennas, sensors and processing functionality for GPS/INS (Global Positioning System/Inertial Navigation System) control, autopilot functionality, as well as controls and processing for a variety of different payloads.

The control module 505 removably attaches to the body 501 via a mated snap-on (e.g., hook and latch) system 551 in the longitudinal center of the body. The control module extends longitudinally in a fore and aft direction that is perpendicular to the longitudinal dimension of the body. Electronic connections are provided by mated electronic connectors (a command connector not shown on the command module, connecting to the intermediate connector 523 of the body 501) for passing power, control signals, and the like between the control module and the body.

The payload module 507 attaches to a front end 161 of the control module. A variety of different payload modules may be interchangeably used, and scanning payloads typically have the ability to pan up and down to a high degree (e.g., on the order of 140°). Lateral panning will typically rely on the UAVs ability to yaw. The payload modules may include color, IR (Infrared), EO (Electro Optical), daytime and/or nighttime cameras, as well as other equipment for tracking, targeting and/or communication functions. It may (directly, or via the command module) be provided with digitally stabilized video. A mating connector system both structurally and electronically links the payload module to the control module, providing for electronic communication and power exchange with the control module.

Compared to the other modules (e.g., the body 101 and propulsion arms 103), the control module 105 might be quite expensive due to its significant electronics and software. The other units may therefore be considered fairly expendable in comparison. Advantageously, the control module only carries relatively low loads (e.g., its own weight and the weight of the payload module), and may therefore be made lightweight. Because of the control module's position on top of the body, and because the body protects the control module from high loading (by isolating the control module from loads between the propulsion arms), the control module can function as a very robust and durable device without requiring its own robust structural elements. Thus, the control module may have a simple, injection-molded housing.

Unlike the first embodiment, each propeller is angled straight up to provide for hovering when the UAV is level. Since the payload extends out in front of the body and only looks in a forward direction, a typical payload might be expected to have unimpeded viewing over a large vertical pan in the forward direction.

Each of the four landing legs 509 extend down from their respective motor. These legs provide for the landed UAV to be level, just as it would be while hovering. Advantageously, this provides for smooth vertical take-offs, as well as allowing the craft to land on a tall, level object in the proper position for the payload to perch and stare down at a target. The legs are constructed of lightweight foam, and are easily detachable and replaceable for fast repair in the field.

As with the original embodiment, to assemble the UAV from a configuration with all elements packed in a carrier, the battery unit (the body) is removed from the carrier. The propulsion arms are then removed from the carrier and affixed to the ends of the body. More particularly, each propulsion arm is snapped into place and its screw is tightened down. The command module is then removed from the carrier and snapped onto the body so that the connectors mate and lock into place. Finally, the payload is snapped or clipped into place.

It is envisioned that the second embodiment of a UAV may have corresponding compatible propulsion arms to form other vehicles such as a UGV, a USV or a UUV, similar to the first embodiment system. Likewise, embodiments formed with combinations of features from the various embodiments are within the scope of the invention.

Figure 36:
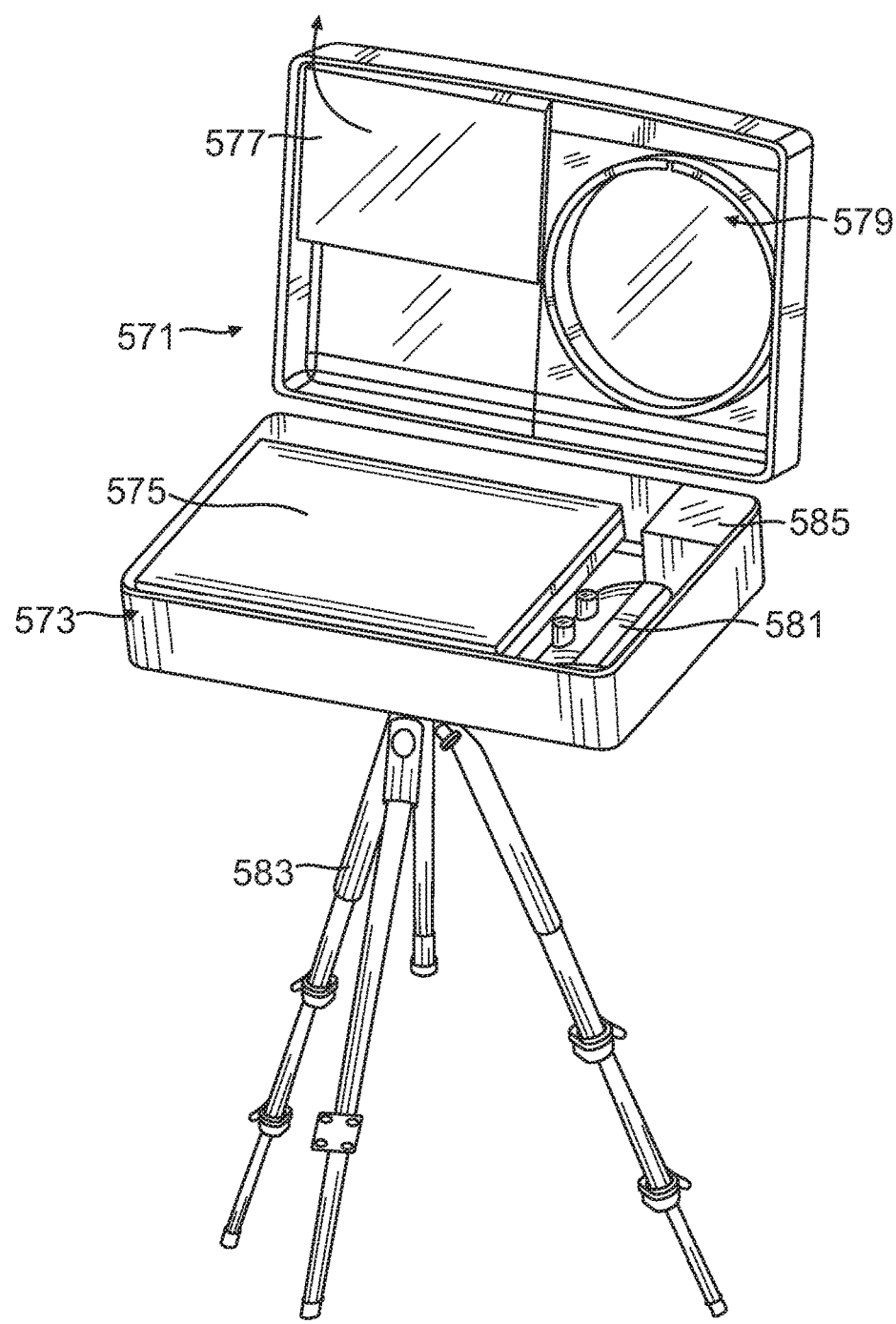
FIG. 36 is a perspective view of a ground control station for any of the vehicles embodying the present invention.

With reference to FIG. 36, any of the above described vehicles may be controlled from a single ground control station 571. The station includes a carry case 573, a laptop computer 575 received by an electrical connector within the case, a wireless transmitter having an antenna box 577 that may swing up from a lid of the case or be placed distant from the case via an antenna cable 579 that is coiled in a pocket of the lid, and a vehicle controller 581 (typically in the form of a game controller or RC vehicle controller) that is connected to the laptop via a fixed, strain relieved cable. The case is configured with an integral or mountable, extendable tripod 583 such that the case may be opened and set up as an operating station. A panel 585 provides external access to a charge/power port and a communication (e.g., USB) port of the computer. All components of the case are powered by the battery of the laptop computer. The laptop may include training software for instructing users on the operation of the vehicle, and providing simulated practice sessions.

Other uses for the ruggedized, integral-battery, load-bearing body are envisioned within the scope of the invention. For instance, other propulsion arms could be configured with continuous tracks for rugged terrain, aerodynamic surfaces for traditional flight (rather than rotary flight), and the like. Additionally, many military devices for use in the field, such as high-luminosity flashlights, power tools, unattended ground sensors, ground communication relays, emergency radios and the like, may be configured to run off the battery power of the load-bearing body.

For example, a bunch of the bodies could be fitted with remote control aircraft landing lights on one end and ground spikes on the other end to provide for rapid deployment of runway lighting to create a makeshift runway. Indeed, having a control module equipped with a solar charger, such a runway light might be operable for and extended period without recharging the batteries. This rechargeable aspect is usable to extend the operation of many of the above-described field devices. In short, the ruggedized battery primary structure body can be a core to a large toolkit of useful products.

It is to be understood that the invention comprises apparatus and methods for designing and producing reconfigurable vehicles, as well as the apparatus and methods of the structurally robust battery pack itself. Additionally, the various embodiments of the invention can incorporate various combinations of these features with other field equipment and/or other systems typically incorporating battery packs. In short, the above disclosed features can be combined in a wide variety of configurations within the anticipated scope of the invention.

While particular forms of the invention have been illustrated and described, it will be apparent that various modifications can be made without departing from the spirit and scope of the invention. Thus, although the invention has been described in detail with reference only to the preferred embodiments, those having ordinary skill in the art will appreciate that various modifications can be made without departing from the scope of the invention. Accordingly, the invention is not intended to be limited by the above discussion, and is defined with reference to the following claims.

What is claimed is:

1. An unmanned vehicle configured for a range of missions, comprising:
    a battery module having battery capacity adequate to provide motive force for the vehicle over the range of missions, the battery module having a plurality of electronic connection ports;
    a control module including a control system configured to control the operation of the vehicle over the range of missions, the control module being directly and removably structurally carried by the battery module, and the control module being directly and removably electronically connected to the battery module via a first connection port of the plurality of connection ports;
    a first propulsion module including a motor configured to provide propulsive force to move the vehicle through one or more missions of the range of missions, the first propulsion module being directly and removably structurally connected to the battery module via a second connection port of the plurality of connection ports; and
    a second propulsion module including a motor configured to provide propulsive force to move the vehicle through the one or more missions of the range of missions, the second propulsion module being directly and removably structurally connected to the battery module via a third connection port of the plurality of connection ports;
    wherein the first propulsion module includes a first arm with a centrally located first-arm connector connected to the second connection port, and two substantially vertically oriented propellers at opposite ends of the first arm;
    wherein the second propulsion module includes a second arm with a centrally located second-arm connector connected to the third connection port, and two substantially vertically oriented propellers at opposite ends of the second arm; and
    wherein each of the substantially vertically oriented propellers is angled slightly toward a forward direction of the vehicle defined by a front end of the vehicle, such that the vehicle is configured to hover at a non-zero pitch angle.

2. The vehicle of claim 1, wherein the second connection port is at the front end of the vehicle.

3. The vehicle of claim 1, and further comprising a payload structurally carried on the control module.

4. The vehicle of claim 3, wherein the control module is configured to support the payload at a non-zero support angle such that the payload is level when the vehicle is oriented at the non-zero pitch angle.

5. The vehicle of claim 1, wherein the first and second propulsion modules are interchangeable, and wherein the second and third connection ports are configured to structurally orient the first and second propulsion modules at an angle that orients the propellers for hovering at the non-zero pitch angle.

6. The vehicle of claim 1, and further comprising landing gear, wherein the landing gear is configured to support the vehicle at the non-zero pitch angle.

7. The vehicle of claim 6, wherein the landing gear is in the form of one or more support structures extending from the first propulsion module to the second propulsion module.

8. A reconfigurable unmanned vehicle system configured for a range of missions, comprising:
    a body including a control system configured to control the operation of the vehicle and a power source having a power capacity adequate to provide complete motive force for the vehicle over the range of missions, the body including a set of one or more body connectors;
    a first set of one or more propulsion modules removably attachable to the set of body connectors, the first set of propulsion modules being one propulsion module type selected from the group of unmanned aerial vehicle propulsion modules, unmanned ground vehicle propulsion modules, unmanned surface vehicle propulsion modules, and unmanned underwater vehicle propulsion modules; and
    a second set of one or more propulsion modules removably attachable to the set of body connectors, the second set of propulsion modules being one propulsion module type selected from the group of unmanned aerial vehicle propulsion modules, unmanned ground vehicle propulsion modules, unmanned surface vehicle propulsion modules, and unmanned underwater vehicle propulsion modules;
    wherein the first set of propulsion modules are of a different propulsion module type than the second set of propulsion modules;
    wherein the first set of propulsion modules includes a first arm with a centrally located first-arm connector configured to connect to a first body connector of the set of body connectors, and two substantially vertically oriented rotors at opposite ends of the first arm;
    wherein the first set of propulsion modules includes a second arm with a centrally located second-arm connector configured to connect to a second body connector of the set of body connectors, and two substantially vertically oriented rotors at opposite ends of the second arm;

wherein the second set of propulsion modules includes a third arm with a centrally located third-arm connector configured to connect to the first body connector, and two wheels at opposite ends of the first arm; and wherein the second set of propulsion modules includes a fourth arm with a centrally located fourth-arm connector configured to connect to the second body connector, and two wheels at opposite ends of the second arm.

9. A reconfigurable unmanned vehicle system configured for a range of missions, comprising:

a body including a control system configured to control the operation of the vehicle and a power source having a power capacity adequate to provide complete motive force for the vehicle over the range of missions, the body including a set of one or more body connectors;

a first set of one or more propulsion modules removably attachable to the set of body connectors, the first set of propulsion modules being one propulsion module type selected from the group of unmanned aerial vehicle propulsion modules, unmanned ground vehicle propulsion modules, unmanned surface vehicle propulsion modules, and unmanned underwater vehicle propulsion modules; and a second set of one or more propulsion modules removably attachable to the set of body connectors, the second set of propulsion modules being one propulsion module type selected from the group of unmanned aerial vehicle propulsion modules, unmanned ground vehicle propulsion modules, unmanned surface vehicle propulsion modules, and unmanned underwater vehicle propulsion modules;

wherein the first set of propulsion modules are of a different propulsion module type than the second set of propulsion modules; and wherein the first and second sets of propulsion modules are each configured such that are equally connectable to both the first body connector and the second body connector.

10. The vehicle of claim 9, wherein:

the first and second body connectors are on opposite longitudinal ends of the body;

each propulsion module of the first and second sets of propulsion modules is configured with an arm and an end cap affixed to an arm, the end caps each being configured to longitudinally hold its respective arm onto the body;

each body connector, is configured with a groove adapted to conformingly and longitudinally receive the arms when the arm connectors are connected to the body connectors; and the body connector grooves are configured to directly bear all vertical loads from the arm connector arms without vertical loads being carried by the arm connector end caps.

* * * * *